US006892390B1

(12) United States Patent
Lieberman et al.

(10) Patent No.: US 6,892,390 B1
(45) Date of Patent: May 10, 2005

(54) METHODS AND SYSTEMS FOR BROADCAST DATA SERVICES

(75) Inventors: Bruce L. Lieberman, Bellevue, WA (US); Robert M. Fries, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/526,579

(22) Filed: Mar. 16, 2000

Related U.S. Application Data

(60) Provisional application No. 60/125,013, filed on Mar. 18, 1999.

(51) Int. Cl.[7] ................................................. H04N 7/16
(52) U.S. Cl. ...................................................... 725/135
(58) Field of Search ................................ 725/135, 139, 725/141; 719/311, 328; 709/236, 250, 227; 370/527, 528, 529, 465, 466

(56) References Cited

U.S. PATENT DOCUMENTS

| | | | | |
|---|---|---|---|---|
| 4,907,079 A | | 3/1990 | Turner et al. ................ | 358/84 |
| 5,572,675 A | * | 11/1996 | Bergler ........................ | 719/328 |
| 5,630,061 A | * | 5/1997 | Richter et al. ............... | 709/227 |
| 5,684,525 A | | 11/1997 | Klosterman .................. | 348/12 |
| 6,041,356 A | * | 3/2000 | Mohammed ................ | 709/227 |
| 6,157,965 A | * | 12/2000 | Mohammed et al. ......... | 710/8 |
| 6,216,173 B1 | * | 4/2001 | Jones et al. .................. | 345/705 |
| 6,633,929 B1 | * | 10/2003 | Hyder et al. .................. | 710/62 |
| 2002/0091816 A1 | * | 7/2002 | Stalker ........................ | 709/224 |

FOREIGN PATENT DOCUMENTS

EP  0849954 A  6/1998  ............ H04N/7/58

OTHER PUBLICATIONS

Ducey, Richard V. "Multimedia Broadcasting and the Internet" Jun. 1996, National Association of Broadcasters <http://www.isoc.org/inet96/proceedings/b3/b3_2.htm>.*

* cited by examiner

Primary Examiner—Vivek Srivastava
Assistant Examiner—Dominic Saltarelli
(74) Attorney, Agent, or Firm—Workman Nydegger

(57) ABSTRACT

The present invention provides for the collection and delivery of broadcast data. Broadcast data is captured by broadcast data sources from television broadcasts and the captured broadcast data is collected by a broadcast data source miniport. The miniport differentiates the broadcast data to separate the requested broadcast data and to separate the broadcast data that complies with a protocol from broadcast data that does not comply with a protocol. The nonrequested broadcast data is preferably discarded and the broadcast data that does not comply with a protocol is encapsulated with appropriate headers. The broadcast data is then transferred through the network or system to a common application interface such as Winsock through NDIS and a protocol such as UDP/IP. Alternatively, a RawData module is used that does not rely on sockets and is capable of communicating with the miniport. A presenter retrieves the broadcast data from either the RawData module or Winsock and prepares the broadcast data for use by an application. The application then accesses the presenter for the prepared broadcast data it requested. In another mode, an application may access unprocessed broadcast data from either Winsock or the RawData module.

38 Claims, 4 Drawing Sheets

METHODS AND SYSTEMS FOR BROADCAST DATA SERVICES

1. RELATED APPLICATION

This application claims the benefit of U.S. Provisional Application No. 60/125,013, filed Mar. 18, 1999, which is incorporated herein by reference.

BACKGROUND OF THE INVENTION

1. The Field of the Invention

The present invention relates to broadcast data. More specifically, the present invention relates to retrieving broadcast data from one or more broadcast data sources and delivering the broadcast data to an application through a common interface.

2. The Prior State of the Art

A television broadcast contains more than video and audio data, it also contains broadcast data. While the primary function of a television broadcast is to transmit video and audio data, additional information may be forwarded to a user, which may or may not be related to the video and audio data, in the form of broadcast data. Typically, broadcast data is embedded or inserted in the television broadcast and is used to convey a wide variety of information including closed captioning data, program guide data, event ratings, crossover Uniform Resource Locators, and more.

Two types of television broadcasts which are used to transmit and carry broadcast data are analog television broadcasts and digital television broadcasts. Because the broadcast data is embedded or added to the television broadcast, the broadcast data does not replace the video and audio data. Unfortunately, the evolution of broadcast data has not been uniform and as a result, broadcast data is typically hard to locate, hard to read, and frequently contains duplicate values. These difficulties in combination with the fact that digital television broadcasts are fundamentally different from analog television broadcasts has led to the development of many different delivery and encoding mechanisms for broadcast data.

In analog television broadcasts, for example, the vertical blanking interval (VBI) is primarily used to carry broadcast data. During the VBI, which occurs 60 times per second, the electron gun of the television set is repositioning itself and video data is not present during this time interval. For this reason, the VBI lends itself to carry broadcast data because the video data is absent during the VBI. Broadcast data can be transmitted over the VBI in a variety of different ways, many of which are standardized and known.

In comparison, a digital television broadcast does not have an analogous VBI. Digital television broadcasts do, however, increase the amount of broadcast data that can be transmitted along with the video and audio data. The nature of a digital television broadcasts also makes it easier to transmit broadcast data. These characteristics of digital television broadcasts have led to broader uses for broadcast data, many of which are proprietary. Digital television broadcasts, such as satellite television and digital cable television, typically carry an MPEG transport stream which carries multiplexed data. The broadcast data in digital television broadcasts is encoded or embedded in the transport stream and is difficult to both locate and extract. Part of this difficulty is related to the different methods for placing broadcast data in a television broadcast and another part of the difficulty is that many different systems are capable of delivering broadcast data in television broadcasts.

An application desiring to use or receive broadcast data faces several problems. The application needs to know the transmission mechanisms of the broadcast data as well as how to acquire the desired broadcast data from a particular transmission system. Also, the application must know how to demultiplex, aggregate and interpret the broadcast data after it has been received and the application should most likely be able to receive the broadcast data from either an analog or a digital television broadcast.

For instance, an application that desires to retrieve ratings information from an analog television broadcast first determines that the ratings information is being transmitted via an analog television broadcast. Next, the application needs to know where, in the VBI of the analog television broadcast, the ratings information is located. The application next retrieves the broadcast data from the appropriate portion of the VBI. The retrieved broadcast data is sorted to retrieve the ratings broadcast data and the other multiplexed broadcast data is discarded. Finally, the application interprets and uses the retrieved broadcast data ratings.

Another problem associated with broadcast data is the ability to receive television broadcasts over computers, set top boxes and other technologically advanced devices. Computers, especially those connected to the Internet and other networks, transfer and receive data according to some protocol. Because broadcast data is simply inserted or embedded into television broadcasts, the appropriate headers are not attached to the broadcast data, which complicates the process of retrieving and processing broadcast data. In other words, broadcast data does not always comply with a particular protocol.

In sum, applications that are capable of utilizing broadcast data must overcome the non-uniformity of the broadcast data, handle the various transmission mechanisms of the broadcast data, and demultiplex, aggregate and interpret the broadcast data that is collected from the television broadcast. It would be an advance in the art to allow applications to access broadcast data through a common interface irrespective of the transmission and delivery mechanisms. Also, it would be an advance in the art to provide applications with access to broadcast data that has been demultiplexed, aggregated, sorted and organized.

SUMMARY OF THE INVENTION

The present invention allows broadcast data to be accessed by applications without regard to the delivery mechanism of the broadcast data. This is achieved in one embodiment by providing Broadcast Data Services (BDS). The objectives of BDS include, but are not limited to, a unification of broadcast data sources, support for protocol requirements, and an increase in the usability of broadcast data.

In one implementation of the invention, the BDS includes a central data collection module or a miniport which functions to collect broadcast data from a BDS source, which is usually a vendor supplied device driver. The miniport defines the behavior of the BDS source and communicates with the BDS source via a BDS source interface. After the miniport has collected the broadcast data, it is transmitted through a network or other system using Network Device Interface Specification (NDIS), User Datagram Protocol/Internet Protocol (UDP/IP) and Winsock. Broadcast data that is not compliant with UDP/IP protocol is transformed to comply with UDP/IP protocol.

By channeling all broadcast data to Winsock, access to broadcast data is significantly simplified because an application is only required to be able to access Winsock rather than a plurality of different BDS sources. Moreover BDS sources are able to alter the transmission mechanism. For example, broadcast data may be sent as UDP/IP packets, or as straight broadcast data. In either event, the broadcast data arrives at Winsock in the same way. BDS achieves broadcast data delivery independence.

Alternatively, BDS provides a BDS RawData module that also functions as an application programming interface through which raw broadcast data may be accessed. Both the presenter and applications are capable of receiving broadcast data through the BDS RawData module. One difference between BDS RawData and Winsock is that the BDS RawData module is able to retrieve broadcast data directly from the BDS miniport without having to go through sockets. Further, the BDS miniport supports direct communication with the BDS RawData module. An application may access the raw broadcast data provided through the BDS RawData module using the BDS RawData interface. Also both UDP/IP compliant broadcast data as well as UDP/IP compliant broadcast data may be accessed through the IBDS RawData interface.

The broadcast data made available through Winsock is, however, unprocessed. Thus, BDS also provides a presenter which is capable of making the broadcast data easier to use. The presenter, for example, prepares the broadcast data for an application by filtering the broadcast data for duplicates, instance filtering the broadcast data, demultiplexing the broadcast data, and aggregating the broadcast data. Another important function provided by the presenter in preparing the broadcast data is formatting the broadcast data into a record or structure such that the broadcast data is readily available and usable by an application.

This implementation of the invention unifies the BDS sources by defining how the broadcast data is handled and by providing a single point where the broadcast data may be collected. Many of the mechanisms and systems that carry broadcast data do not inherently use standard protocols such as UDP/IP. BDS overcomes this problem by being able to differentiate broadcast data that complies with a protocol from broadcast data that does not comply with a protocol. The broadcast data that does not comply is encapsulated with the necessary headers such that the data complies with a particular protocol. Finally, BDS makes the broadcast data more friendly to applications by providing services such as filtering and formatting.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawing depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
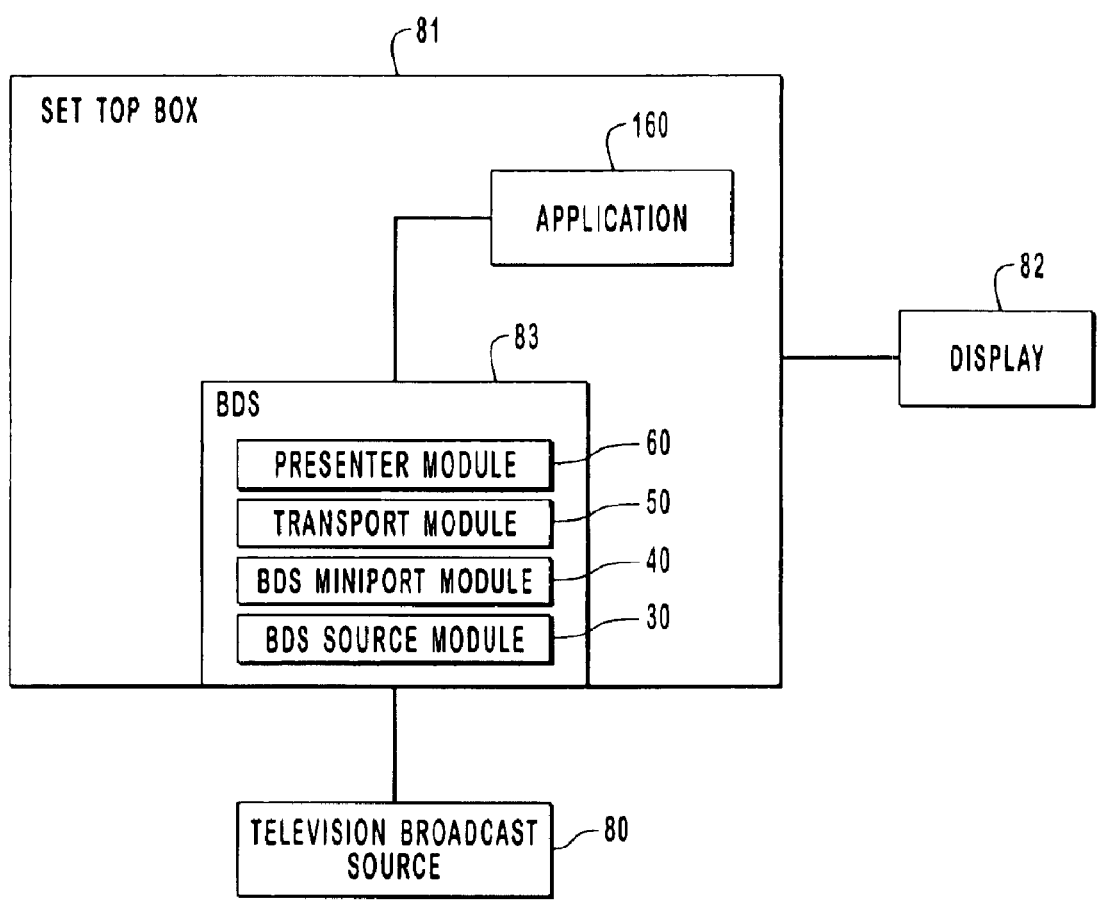
FIG. 1 is a block diagram of an exemplary system which implements Broadcast Data Services.

Digital and analog television broadcasts carry, in addition to video and audio data, broadcast data. The broadcast data is embedded or inserted in the television broadcasts in a variety of different methods and places, and applications which use the broadcasts data must overcome several problems. The application must know the transmission mechanisms of the broadcast data as well as how to acquire the broadcast data from the different transmission mediums. Additionally, the application is responsible for demultiplexing, aggregating and interpreting or otherwise processing the broadcast data. Another problem faced by applications this that the broadcast data may not be formatted for a particular system or protocol. These problems exist in part because the sources of broadcast data are not uniform, and because broadcast data is available over different mediums and transmission mechanisms. Thus broadcast data is difficult to locate, hard to read and may contain duplicate and repeated transmissions.

The present invention provides a Broadcast Data Services (BDS) which overcomes these and other problems. BDS relieves an application of the burden of collecting the broadcast data from the various broadcast data sources by collecting the broadcast data and by tunneling the collected broadcast data through Winsock, which is a common applications programming interface between applications and a protocol, and through BDS RawData, which is a computer object model (COM) interface. BDS further provides a presenter which has the capability of retrieving the broadcast data from Winsock and preparing the broadcast data for an application.

The presenter processes and organizes the broadcast data to remove duplicates and appropriately format the broadcast data. By connecting with the presenter interface, an application can receive broadcast data that has been demultiplexed, formatted and organized. Alternatively, an application may connect directly with Winsock to receive broadcast data collected from one or more broadcast data services, but the broadcast data may be unorganized, unfiltered and unformatted. Preferably, an application receives broadcast data through the presenter.

In general, BDS may be described by four general stages or modules. The first module comprises BDS sources which capture the broadcast data from the analog or digital television broadcasts or television signals. The BDS sources deliver the captured broadcast data to the second stage or module comprised of a BDS miniport, which provides functions and methods for initially processing the raw broadcast data. The BDS miniport delivers the data to a protocol, network or transport module which has the capability of distributing the collected broadcast data through a network, system, protocol, set top box or other device. In many systems and networks, this module is readily available.

Finally, the broadcast data is delivered to the fourth state or module. The fourth or presentation module formats and filters the raw broadcast data for the application that initially requested the broadcast data. The presentation module is the preferred access point for various applications because the broadcast data is ready to be used by an application. In this manner, BDS provides for unifying the acquisition of embedded broadcast data and provides for a consistent delivery of the broadcast data to applications by making the broadcast data available, in one embodiment, through a common interface. Because the broadcast data is delivered through Winsock and a presentation module, the application is relieved of comprehending how the broadcast data was actually delivered as well as relieved of formatting and processing the retrieved broadcast data.

The invention is described in terms of diagrams and flow charts. Using the diagrams and flow charts in this manner to present the invention should not be construed as limiting its scope. Rather, the diagrams and flow charts are intended to be exemplary embodiments of the present invention. In addition, the embodiments of the present invention may comprise a special purpose or general purpose computer comprising various computer hardware.

Embodiments within the scope of the present invention also include computer-readable media having computer-executable instructions or data structures stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to store the desired executable instructions or data structures and which can be accessed by a general purpose or special purpose computer, such as one included in a set top box. When information is transferred or provided over a network or other communications connection to a computer, the computer properly views the connection as a computer-readable medium. Thus, such a connection is also properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions. The computer-executable instructions and associated data structures represent an example of program code means for executing the steps of the invention disclosed herein.

Although not required, the invention can be described in the general context of computer-executable instructions, such as program modules, being executed by one or more processors included, for example, in a set top box. Generally, program modules include routines, programs, objects, components, data structures, etc. that perform particular tasks or implement particular abstract data types. Moreover, those skilled in the art will appreciate that the invention may be practiced with other computer system configurations, including general purpose computers, personal computers, hand-held devices, multi-processor systems, microprocessor-based or programmable consumer electronics, network PCs, minicomputers, mainframe computers, and the like.

As used herein, "broadcast data" refers to data which is stored, embedded, inserted, added or encoded in another signal. More specifically, broadcast data refers to the information stored, embedded, inserted, added or encoded in an analog or digital television broadcast signal or transmission which is not the audio or video data. Examples of broadcast data include, but are not limited to, closed captioning data, Uniform Resource Locators (URLs), program guide data, event ratings, MPEG-2 SI tables, MPEG-2 DSMCC Multi-ProtocolEncapsulation packets, and download data. Broadcast data further encompasses event notification.

There are currently five classes or types of broadcast data, although other types or classes may be added or created and the present invention is not limited to the enumerated types of broadcast data: VBI Line 21, VBI Lines 10–20, MPEG Streams, MPEG Sections, and MPEG Picture User_Data. VBI Line 21 and VBI Lines 10–20 broadcast data are related to broadcast; data on analog television (ATV) signals. Lines 1 through 9 are not presently used to carry broadcast data. Lines 10 through 20 are used to carry data and are typically encoded under the NABTS standard which offers 36 bytes of data per line. The broadcast data carried by lines 10 through 20 may be further encoded to carry UPD/IP packets. Line 21 offers 2 bytes of data per line, and potentially carries many different types of information, including the name or title of a television program, the content ratings, the aspect ratio, caption services, channel map, and weather warnings.

In contrast, a digital television broadcast stream can be a single MPEG stream or a multiplexed MPEG transport stream, which is the case of cable television and satellite television. The transport stream carries multiplexed elementary streams which are either a packetized elementary stream (PES) or a Sections stream. A PES stream may carry audio packets, video packets or private information packets. A Sections stream carries a series of public and private sections. The public sections are combined to form the MPEG defined information tables and the private sections are usually combined to form additional vendor specific information tables.

A transport stream, in one embodiment, is a series of 188 byte transport stream packets and each stream packet has a header containing a Packet ID (PID) which is used to demultiplex the transport stream into the elementary streams. The PID also determines whether the transport stream packet contains section data or PES packets. If the PES packet is a video PES packet, it contains places where user_data can be intermixed such as picture user_data. VBI line 21 information is carried as picture user_data. MPEG sections are used to carry table of information that define the content of the transport stream.

As described previously, the retrieval and use of broadcast data has been a difficult process. FIG. 1 illustrates an exemplary system which implements an embodiment of the present invention. Broadcast data is inserted or otherwise placed in a television broadcast by television broadcast source 80, which may be a satellite television source, a cable television source, or a terrestrial broadcast television source. The television broadcast, which may be analog or digital, produced by television broadcast source 80 is received by set top box 81 in this embodiment.

BDS 83 provides, in this embodiment, application 160 access to the broadcast data without application 160 having to know how the broadcast data was delivered. BDS 83 provides delivery independence to applications desiring to make use of broadcast data. BDS 83 provides four modules for retrieving and delivering the broadcast data to application 160 in a preferred embodiment.

BDS Source module 30 comprises the device drivers that capture broadcast data from the television broadcasts. BDS Miniport module 40 collects broadcast data from BDS Sources module 30. BDS Miniport module 40 also provides demultiplexing functions and is capable of differentiating UDP/IP data from non-UDP/IP data. Transport module 50 provides the necessary protocol and transfer functions necessary to transmit the broadcast data collected by BDS miniport module 40 to BDS presenter module 60 or directly to application 160. Finally, presenter module 60 organizes, formats, and filters the broadcast data, and presents the broadcast data to application 160. In one embodiment, application 160 may provide the broadcast data to a user via display 82, which may be a television set or a computer monitor.

Figure 2:
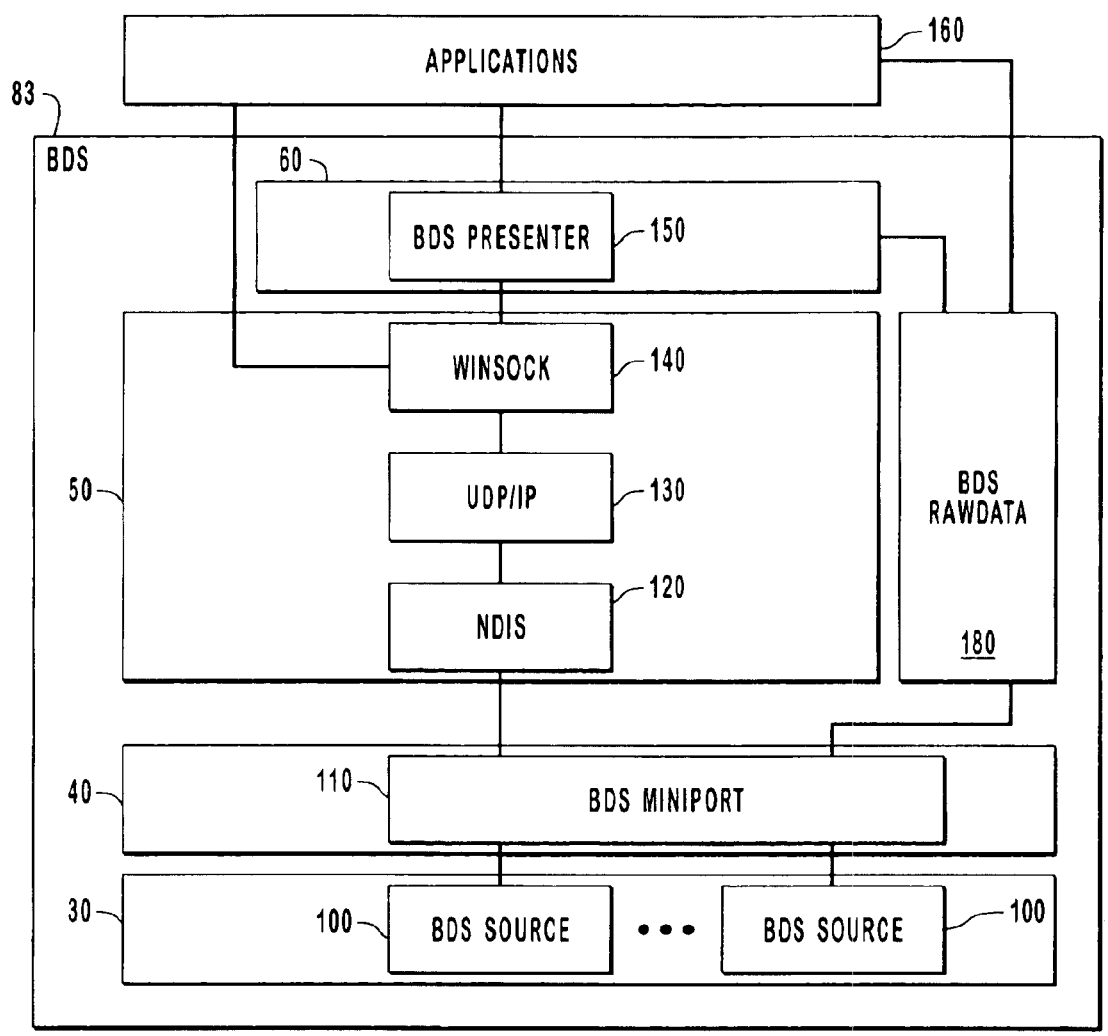
FIG. 2 is an exemplary block diagram illustrating the retrieval of broadcast data from broadcast data sources and the delivery of the broadcast data to one or more applications.

FIG. 2 is a block diagram generally illustrating the path of broadcast data from a broadcast data source to an application through BDS 83. FIG. 2 also illustrates a more detailed view of BDS sources module 30, BDS miniport module 40, transport module 50 and presenter module 60. Applications 160 receive broadcast data preferably through BDS presenter 150 which provides functions to filter and format the broadcast data for applications 160. Alternatively, applications 160 may receive broadcast data directly from Winsock 140.

Winsock 140 receives the broadcast data from UDP/IP 130. UDP/IP 130 is a protocol related to TCP/IP protocol, but offers limited services compared to TCP/IP protocol. Specifically, UDP/IP 130 is ideal because UDP/IP does not require two way communication as does TCP/IP, and television broadcasts are a one way communication. UDP/IP 130 is preferred, therefore, because TCP/IP may be either too complex, too slow or simply not feasible for broadcast data. Although UDP/IP is preferred in the embodiment illustrated in FIG. 2, other protocols, including TCP/IP, may be used and may be entirely adequate in other embodiments of the present invention.

UDP/IP 130 receives the requested broadcast data from NDIS 120. NDIS 120 is a software interface that interfaces with UDP/IP 130 and BDS miniport 110. NDIS 120 receives the broadcast data from BDS miniport 110, which collects broadcast data from BDS sources 100. BDS sources 100 capture and produce the broadcast data from the television broadcasts.

FIG. 2 also illustrates the path of broadcast data through BDS RawData 180. In this scenario, BDS RawData 180 receives the collected broadcast data from BDS miniport 110. BDS RawData may be accessed via a BDS RawData interface by either BDS presenter 150 or applications 160. Alternatively, BDS RawData 180 may receive non-compliant UDP/IP data from BDS miniport 110 and may receive UDP/IP compliant broadcast data from Winsock 140.

Figure 3:
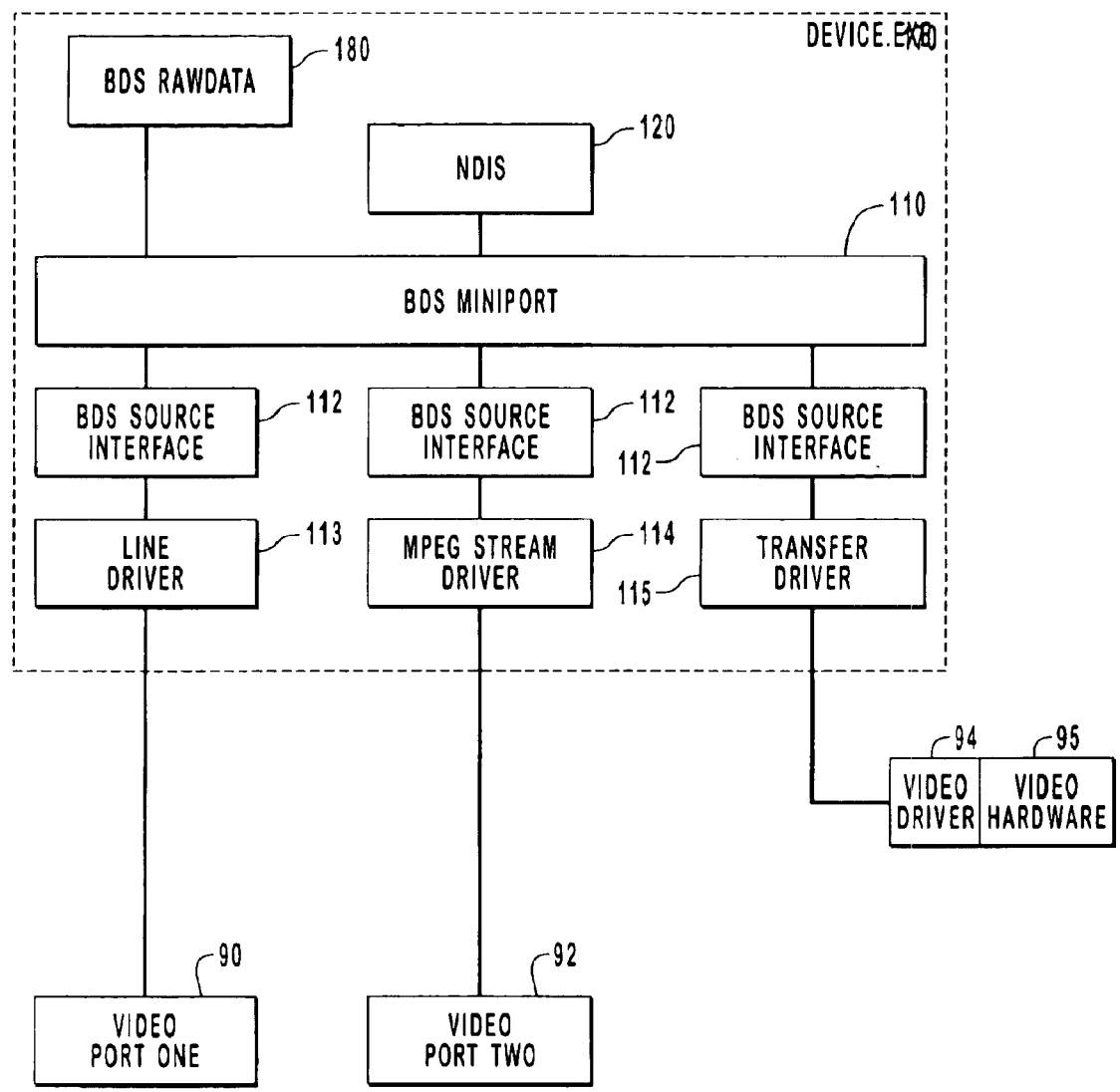
FIG. 3 is a block diagram illustrating one embodiment of a system and method for retrieving broadcast data from television broadcasts.

FIG. 3 is a detailed block diagram illustrating the transfer of broadcast data from a broadcast data source to NDIS 120. The basic source of broadcast data is video port 90 which comprises the hardware necessary for tuning and displaying either an analog or a digital video stream or television broadcast. Typically, set top boxes only have one video port 90 available. However, systems or devices that support picture in picture (PIP) or out of band (OOB) tuning have a second or third video port. Video ports are typically numbered within a system and are shown in FIG. 3 as video port one 90 and video port two 92. Video ports 90 and 92, shown in FIG. 3 are representative of video ports carrying digital and/or analog video streams.

BDS sources comprise a plurality of drivers, and FIG. 3 illustrates an embodiment having line driver 113, MPEG Stream driver 114 and transfer driver 115, each of which represents an example of BDS sources 100 of FIG. 2. In the following description of FIG. 3, line driver 113, MPEG Stream driver 114 and transfer driver 115 are collectively referred to as BDS sources 113, 114, and 115. It should be understood, however, that the description of FIG. 3 is also applicable to any other BDS source. BDS sources are typically vendor supplied and each BDS source may decode one or more classes of broadcast data which may be present at the respective video port. Video port one 90 of FIG. 3, for example, may receive an analog television broadcast which has two types or classes of broadcast data which are decoded by line driver 113: VBI line 21 broadcast data and VBI lines 10–20 broadcast data.

BDS miniport 110 appears to NDIS 120 as a plurality of NDIS miniport drivers, one for each video port in a system. BDS miniport 110 has two primary objectives: unify the acquisition and delivery of broadcast data from the broadcast data sources; and provide support for UDP/IP datagrams or packets. In order to meet these objectives, BDS miniport 110 provides a number of related functions. When application 160 requires broadcast data, the request is received by BDS miniport 110. In response to the request by application 160, BDS miniport 110 requests the broadcast data from the relevant BDS source. For example, an application requesting Line 21 broadcast data would make a request directed to Line Driver 113.

In addition to requesting the broadcast data, BDS miniport 110 collects or receives the broadcast data from BDS sources. The broadcast data received by BDS miniport 110 is separated into broadcast data complying with UDP/IP protocol and broadcast data which does not comply with UDP/IP protocol. The broadcast data which complies with UDP/IP protocol is delivered to NDIS 120 and the non-compliant broadcast data is encapsulated with the necessary UDP/IP headers and delivered to NDIS 120. NDIS 120, as described in reference to FIG. 2, causes the broadcast data to be transmitted using UDP/IP protocol to Winsock. Alternatively, BDS miniport 110 delivers the broadcast data directly to BDS RawData 180. BDS RawData 180 provides access to all broadcast data from BDS miniport 110. However, BDS RawData 180 does not provide filtering or formatting. BDS RawData does not process the broadcast data, it simply delivers the broadcast data to either BDS presenter 150 or applications 160.

One aspect of transmitting broadcast data to Winsock is understanding the relationship between a multicast IP address, a multicast Media Access Control (MAC) address and UDP ports. With reference to FIG. 2, application 160 or BDS presenter 150 requests broadcast data from Winsock 140 by binding to a specific UDP port and by joining an IP multicast address on a subnet. UDP/IP 130 translates the request for a multicast IP address on a subnet into a request for a multicast address on a network interface card (NIC). This request is then issued to BDS miniport 110 through NDIS 120. The relationship between the multicast IP address, the multicast MAC address and BDS is as follows:

Multicast IP address: 238.<SC>.<PID-hi>.<PID-lo>

Multicast MAC address: 01:00:10:<SC>:<PID-hi>:<PID-lo>.

The choice of subnet causes UDP/IP to select the NDIS miniport which is translated by BDS miniport 110 into a video port. For example, video port <V> is on a subnet identified by the IP address 10.11.<V>.1. IP address 10.11.<v>.1 is associated with a BDS miniport driver. For regular UDP/IP traffic, an application specifies the IP multicast address and UDP port number and Winsock is used normally. For non-UDP/IP traffic, an application specifies the IP multicast address and UDP port number. The IP multicast address encodes the type of source data desired and the UDP port number is only used to differentiate table on MPEG Sections. Decoding the appropriate multicast address is part of transferring the broadcast data from a BDS miniport to Winsock.

Thus, UDP/IP compliant broadcast data is delivered as addressed and non-UDP/IP data is given a UDP/IP header having the BDS defined value appropriate to the type of broadcast data requested by the application. In other words, UDP/IP broadcast data is received at a UDP/IP address and non-UDP/IP broadcast data is received at a fabricated UDP/IP address. In both instances, the broadcast data is received at the socket where the broadcast data was requested. In addition to differentiating between UDP/IP broadcast data and non-UDP/IP broadcast data, BDS miniport 110 differentiates and separates the requested broadcast data from broadcast data that was not requested by application 160.

More specifically, with regard to broadcast data that does not comply with UDP/IP, the non compliant data is made to appear as compliant broadcast data. Non compliant broadcast data is given a DIX header, an IP header and a UDP header such that it appears that the packet was delivered over an Ethernet network or another network. This packet is delivered to NDIS, which in turn delivers the packet to UDP/IP, which strips off the added headers and delivers the broadcast data up through winsock to the application that requested the broadcast data.

The critical element to consider when adding headers to the non compliant broadcast data is the choice of destination address. The MAC header is ignored by NDIS, UDP/IP and Winsock. The IP address has a multicast destination address. The IP multicast address is selected such that when an application selects an address, and NDIS applications programming interface call is made to the BDS miniport. This permits the BDS miniport to know that broadcast data was requested.

In order for each driver or each BDS source to effectively communicate broadcast data to BDS miniport 110, several requirements should be met by each BDS source. Because there are different types of broadcast data and because a system may have more than one video port, each BDS source 113, 114, and 115 knows which classes or types of broadcast data it produces as well as which video port 90 is providing those classes or types of broadcast data. Thus, Line driver 113 knows that it may produce VBI Line 21 class broadcast data or VBI Line 10–20 class broadcast data, and as illustrated in FIG. 3, this broadcast data originates at video port one 90. Similarly, MPEG stream driver 114 knows that it produces at least MPEG stream class broadcast data and that this broadcast data is at video port two 92.

In addition to a driver or BDS source 100 of FIG. 2 knowing the type or class of broadcast data it produces, each BDS source 113, 114, and 115 registers with BDS miniport 110 for each different combination of video port and class of data. Thus, if a BDS source decodes VBI Line 21 class broadcast data and VBI Line 10–20 class broadcast data over the same video port, that BDS source would register with BDS miniport 110 two times because there are two different combinations present.

BDS sources 113, 114, and 115 deliver broadcast data to BDS miniport 110 as soon as the broadcast data is received. BDS sources 113, 114, and 115 also immediately notify BDS miniport 110 of events such as lost data when they occur. A class of broadcast data or a substream of the broadcast data can be enabled and disabled by a command from BDS miniport 110.

BDS source interface 112 is implemented by BDS miniport 110 and is used to connect BDS miniport 110 with BDS sources 113, 114, and 115 and provides methods or functions allowing the BDS sources to register with BDS miniport 110. BDS source interface 112 also allows BDS sources 113, 114, and 115 to deregister from BDS miniport 110. Finally, BDS source interface 112 permits BDS sources 113, 114, and 115 to deliver broadcast data or an event to BDS miniport 110. BDS source interface 112 is, in a preferred embodiment, an application program interface (API) to which BDS sources 113, 114, and 115 may interface.

As illustrated in FIG. 3, most device drivers or BDS sources 113, 114, and 115 reside in device.exe 170, which is a process that executes the vendor supplied device drivers. Occasionally a hardware device driver is not located in device.exe 170, but the device driver can still be a BDS source 100. FIG. 3 illustrates a video driver 94 for video hardware 95 which is not resident in device.exe 170. In this situation, transfer driver 115 is created which simply relays commands, broadcast data and events between video driver 94 and BDS miniport 110. Transfer driver 115 is viewed as the BDS source and registers with BDS miniport 110. Transfer driver 115 is frequently referred to as a BDS source proxy.

In one embodiment, BDS source interface 112 provides methods that allow BDS sources to connect to BDS miniport 110. The register method is used by a BDS source to register itself and the type of broadcast data it produces with a BDS miniport. The parameters specified by the register method can include: ApplicationField, SelectRoutine VideoPort, DataSource and SourcingHandlePointer. ApplicationField is not used by BDS source interface 112, but is returned in every broadcast data selection. SelectRoutine specifies the procedure that will by called by BDS miniport 110 to specify the reception of specific data. VideoPort specifies the video port from which broadcast data is desired. DataSource indicates the source of the desired data and SourcingHandlePointer is used for all calls to a particular BDS source interface.

Another method provided by BDS source interface 112 is the deregister method, which is used to deregister a BDS source with a BDS miniport. Deregister specifies a single parameter in one embodiment: SourcingHandle, which is the handle that was initially returned by the register method. BDS source interface 112 also provides an Indicate method, which indicates the reception of broadcast data or an event notification.

One embodiment of Indicate provides the following parameters: SourcingHandle, StreamID, Indication, DataLength, NumberFragments, Fragment0Length, and Fragment0Location. SourcingHandle is the handle returned by Register. StreamID is the multiplex ID or PID. Indication is the type of event. The events include a notification that broadcast data is being delivered, a notification that some broadcast data was not received, a notification that the requested broadcast data is unavailable and a notification and the requested broadcast data is no longer available. In a generic sense, broadcast data includes events. DataLength indicates the number of bytes being delivered and NumberFragments indicates the number of fragments being delivered. Fragment0Length is the number of bytes in the $0^{th}$ fragment and Fragment0Location indicates the location of the $0^{th}$ fragment. In addition to these methods, a BDS miniport can cause the broadcast data produced by a BDS source to be either enabled or disabled. Alternatively, the methods provided by BDS source interface II 2 may be utilized by BDS RawData 180 to receive the broadcast data from the BDS sources.

Each class or type of broadcast data is preferably delivered to a BDS miniport in a particular format. Requiring the BDS sources to comply with a particular format ensures that broadcast data can be delivered to applications through a common interface such as Winsock. Each separate class of BDS source broadcast data is subject to certain requirements when delivering broadcast data to a BDS miniport. When a new class or type of broadcast data is created, the new class or type of broadcast data may be delivered as desired.

Figure 4:
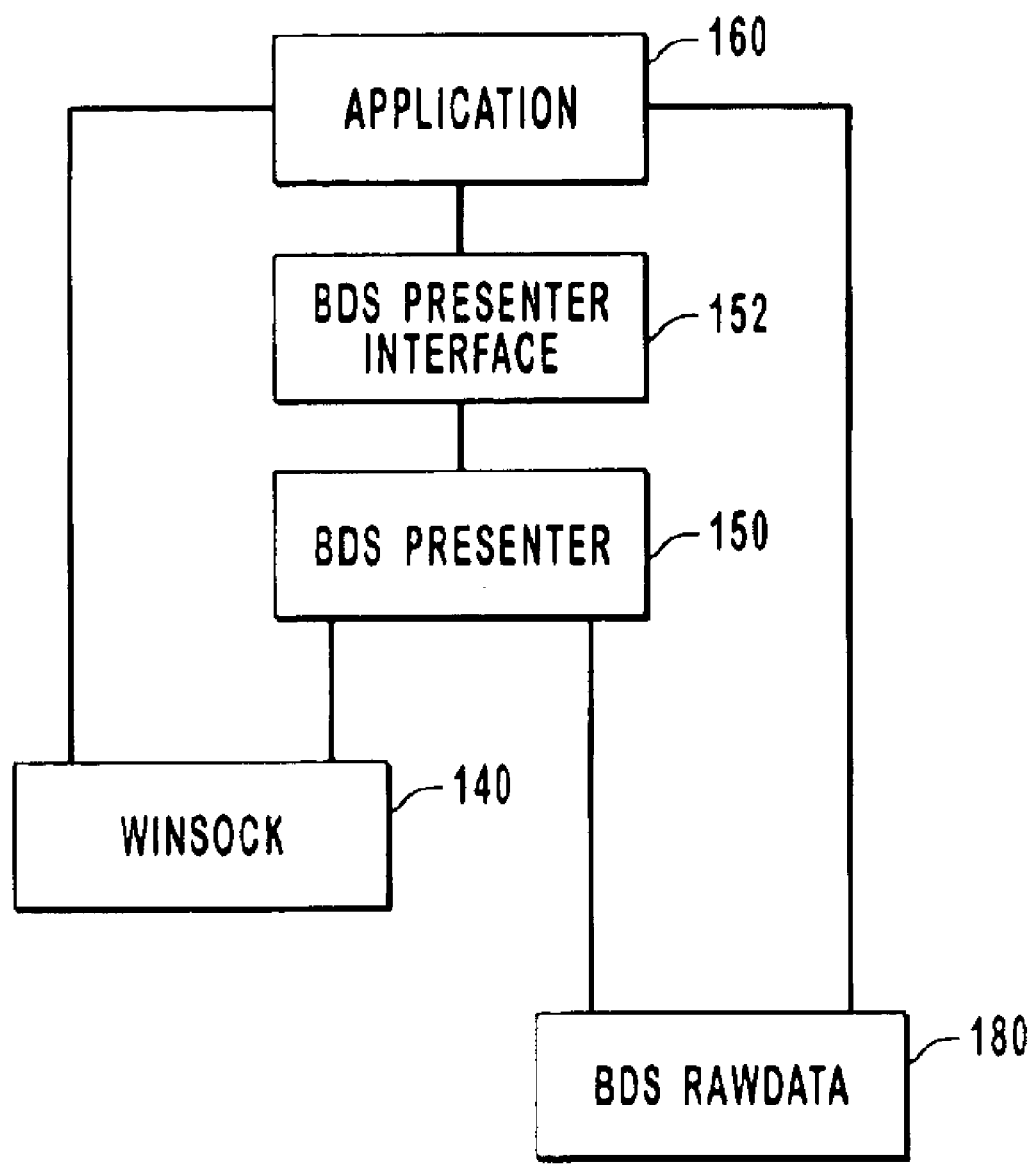
FIG. 4 is a block diagram illustrating one embodiment of a system and method for delivering broadcast data to one or more applications.

FIG. 4 is a block diagram illustrating the presentation of broadcast data to an application. Broadcast data, after it has been retrieved by BDS miniport 110, is in a raw form. Raw broadcast data has not been filtered, demultiplexed or formatted. If application 160 desires to receive raw broadcast data, the raw broadcast data is delivered to application 160 through either Winsock 140 or through a BDS RawData interface, but application 160 is then responsible for processing the raw broadcast data which may include, but is not limited to filtering, demultiplexing and formatting the broadcast data.

BDS RawData 180 provides a single point of access for all broadcast data, but the broadcast data is available in a raw form and is not processed. When requesting broadcast data through BDS RawData 180, application 160 should specify the type of broadcast data it desires to receive, which includes the relevant video port, the type of broadcast data, and the instance information. BDS RawData 180 provides a BDS RawData interface, which is preferably an API, which provides methods that allow the broadcast data to be accessed by either applications 160 or BDS presenter 150.

SelectRawData is a method which allows an application to select and enable a particular class or type of broadcast data. The parameters of SelectRawData include ApplicationField, RawDataCallbackRoutine, VideoPort, DataType, Instance Information, Options, and RawDataHandlePointer. DeSelect RawData is a method which allows an application to indicate to BDS RawData that a particular class or type of broadcast data is no longer needed or desired and it has a RawDataHandle parameter.

BDS presenter 150 improves the usability of broadcast data by providing additional services and functions to application 160 which are not otherwise provided for broadcast data. BDS presenter 150 connects with Winsock 140 in a well known manner and receives the raw broadcast data. BDS presenter 150 has the capability of demultiplexing the raw broadcast data, aggregating the raw broadcast data, instance filtering the broadcast data, filtering the broadcast data for duplicates, filtering the broadcast data for the current or next value and also formatting the broadcast data. Preferably, BDS presenter 150 formats the broadcast data by parsing the broadcast data and storing the broadcast data in a data structure or a data record which is then available to application 160.

BDS presenter 150 is typically replicated in various applications 160. Application 160 specifies the broadcast data that is to be received. Specifically, application 160 should specify the video port, which as indicated previously, is a system wide parameter and can be obtained from the system. Application 160 should specify for BDS presenter 150 the type of broadcast data it wishes to receive, which includes the relevant video port, the type of data, instance filtering and, optionally, an alternate UDP/IP address. The type of data specified by an application implies various aspects of the broadcast data to BDS presenter 150 such as which source produces the broadcast data, as well as how to demultiplex, aggregate, filter and format the broadcast data BDS Presenter Interface 152, in a preferred embodiment, is an API which provides access to filtered and formatted broadcast data. SelectData is a method provided by BDS presenter interface 152 which allows application 160 to select and enable a particular class or type of broadcast data. The parameters of SelectData include ApplicationField, PresentRoutine, VideoPort, DataType, InstanceFilter, AlternateMulticastIP, AlternateUDPPort, Options, and PresenterHandlePointer. DeSelectData is a method which allows application 160 to indicate to BDS presenter 150 that a particular class or type of broadcast data is no longer desired by application 160 and its parameters include PresenterHandler.

ReleaseData is used by application 160 to return broadcast data or a data record to BDS presenter 150 which had been delivered. The parameters of ReleaseData are PresenterHandle and DeliveryLocation. Application 160 should release the broadcast data or the data record when finished. Additionally, a callback routine is provided by application 160 which enables BDS presenter 150 to deliver data records and event indications to application 1160.

A more complete description for the APIs described in this document may be found in the provisional application which has previously been incorporated by reference.

Broadcast Data Services Example

The following example is intended to illustrate how broadcast data can be acquired from a BDS source and delivered to an application. The example illustrates a parental control module or application acquiring ratings broadcast data from a television broadcast. The first step is to acquire and deliver the broadcast data. Ratings information is typically sent in VBI Line 21 broadcast data. Analog television broadcast sends two bytes of data in every frame in Line 21 of the VBI and digital television broadcasts send three bytes inside of Picture User_data.

With reference to FIG. 2, if a digital television broadcast is received, the digital data is demultiplexed and separated from other data. The stream of data is collected by the respective driver or BDS source 100. The broadcast data is collected from BDS Source 100 by BDS miniport 110, which delivers the broadcast either to BDS RawData or through NDIS 120 and UDP/IP 130 to Winsock 140. At this point, the raw broadcast data may be collected by an application directly from Winsock 140. Preferably, the raw broadcast data is retrieved by a BDS presenter 150 which instance filters the raw broadcast data to extract the ratings data from all of the other data. The ratings data is also duplicate filtered such that the broadcast data is discarded if it has been previously delivered to an application. The raw broadcast data may also be demultiplexed into component data. Next, the filtered broadcast data is formatted and the ratings information is parsed and placed in a structure that is delivered to application 160. When application 160 is finished with the broadcast data, application 160 releases the broadcast data.

In sum, BDS makes all broadcast data available as if it were for Winsock or BDS RawData. However, Winsock and BDS Rawdata are intended to be illustrative rather than limiting. By making broadcast data available through either Winsock or BDS RawData, delivery independence is achieved by BDS. The providers of broadcast data are unified by complying With the requirements of BDS and applications are no longer concerned with how the broadcast data is delivered. Further, BDS processes the broadcast data such that it is more structured and manageable for an application. An application is able to receive only the broadcast data it requires.

While the present invention has been disclosed herein in reference to specific APIs, protocols, device drivers and the like, the invention also extends to any other methods and systems that may use other analogous components that perform the general functionality described in this document. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a system capable of receiving television broadcasts, a method for presenting broadcast data that is embedded in the one or more television broadcasts to an application, the method comprising:

receiving a request from an application for broadcast data, the request specifying a type of the requested data, a video port from which the requested data should be received and any filtering that should be performed on the data;

capturing the broadcast data from one or more television broadcasts that are received at one or more video ports by one or more respective broadcast data sources, each of the broadcast data sources comprising a driver having means for decoding the broadcast data;

delivering the captured broadcast data to a miniport, the miniport comprising means for differentiating and separating the requested broadcast data from the captured broadcast data, the miniport further comprising means for differentiating between compliant broadcast data and non-compliant broadcast data and means for encapsulating non-compliant broadcast data with appropriate headers so as to be compliant;

transferring the broadcast data from the miniport to a common application interface;

retrieving the broadcast data from the common application interface by a presenter, the presenter comprising means for obtaining the broadcast data form both a common application interface comprising Winsock and a RawData interface; and preparing the broadcast data, by the presenter, for presentation to the application, as specified by the application.

2. A method as defined in claim 1, wherein the miniport performs the steps of:

differentiating broadcast data that complies with a protocol from broadcast data that does not comply with the protocol; and encapsulating the broadcast data that does not comply with the protocol with headers such that the broadcast data complies with the protocol.

3. A method as defined in claim 2, wherein the protocol is UDP/IP.

4. A method as defined in claim 1, wherein the step of transferring the broadcast data further comprises the steps of:

transferring the broadcast data from the miniport to NDIS;

transferring the broadcast data from NDIS to a protocol; and transferring the broadcast data from the protocol to the common application interface.

5. A method as defined in claim 1, wherein the common application interface is Winsock.

6. A method as defined in claim 1, wherein the common application interface is a RawData interface.

7. A method as defined in claim 1, wherein the step of preparing the broadcast data further comprises at least one of the steps of:

demultiplexing the broadcast data;

aggregating the broadcast data;

instance filtering the broadcast data;

duplicate filtering the broadcast data; and formatting the broadcast data for the application.

8. A method as defined in claim 1, wherein the step of capturing the broadcast data further comprises the step of enabling the broadcast data source.

9. In a system capable of receiving television broadcasts having broadcast data, a method for collecting broadcast data from one or more broadcast data sources, the method comprising;

calling, by one or more broadcast data sources, a function of a broadcast data source interface, wherein the broadcast data source interface permits the one or more broadcast data sources to interface with a broadcast data source miniports, wherein each of the one or more broadcast data sources comprises a driver having means for receiving and decoding the broadcast data that is embedded within television broadcasting and that is received at one or more video ports by the one or more respective broadcast data sources, and wherein the miniport comprises:

means for differentiating and separating broadcast data requested by one or more applications from the broadcast data captured by the broadcast data source, means for differentiating between compliant broadcast data and non-compliant broadcast data, and means for encapsulating non-compliant broadcast data with appropriate headers so as to be compliant; and executing the function by the broadcast data source interface.

10. A method as defined in claim 9, wherein the function comprises registering the one or more broadcast data sources with the miniport.

11. A method as defined in claim 9, wherein the function comprises deregistering the one or more broadcast data sources with the miniport.

12. A method as defined in claim 9, wherein the function comprises indicating reception of the broadcast data and even notifications.

13. A method as recited in claim 9, further comprising:

calling, by the one or more applications, a function having one or more parameters of a presenter interface, wherein the presenter interface provides the one or more applications access to a broadcast data presenter, the broadcast data presenter comprising means for retrieving the requested broadcast data from a common application interface; and executing the function having the one or more parameters of the presenter interface.

14. A method as defined in claim 13, wherein the function having one or more parameters of the presenter interface comprises th one more applications selecting and enabling a particular class or type of broadcast data that is desired.

15. A method as defined in claim 13, wherein the function having one, or more parameters of the presenter interface comprises the one or more applications indicating to the broadcast data presenter that the particular class or type of broadcast data is no longer desired.

16. A method as defined in claim 13, wherein the function having one or more parameters of the presenter interface comprises the one or more applications returning the broadcast data to the broadcast data presenter.

17. A method as recited in claim 13, further comprising:
calling, by the one or more applications or the presenter, a function having one or more parameters of a RawData interface, wherein the RawData interface permits the one or more applications or the presenter to interface with a RawData module, wherein the RawData module comprises means for obtaining the requested data from the miniport in a raw format and for presenting the requested data to the one or more applications without the use of NDIS; and
executing the function having the one or more parameters of the RawData interface.

18. A method as defined in claim 17, wherein the function having one or more parameters of the RawData interface comprises the one or more applications specifying a particular class or type of broadcast data that is desired.

19. A method as defined in claim 18, wherein the function the RawData interface comprises class or type of broadcast data is no longer desired.

20. A computer program product for implementing, in a system capable of receiving television broadcasts having broadcast data, a method for collecting the broadcast data from one or more broadcast data sources, the computer program product comprising:
one or more computer readable media carrying computer executable instructions for implementing the method, wherein the computer executable instructions comprise program code means for:
calling, by one or more broadcast data sources, a function of a broadcast data source interface, wherein the broadcast data source interface, permits the one or more broadcast data sources to interface with a broadcast data source miniports, wherein each of the one or more broadcast data sources comprises a driver having means for receiving and decoding the broadcast data that is embedded within television broadcasting and that is received at one or more video ports by the one or more respective broadcast data sources, and wherein the miniport comprises:
means for differentiating and separating broadcast data requested by one or more applications from the broadcast data captured by the broadcast data source,
means for differentiating between compliant broadcast data and non-compliant broadcast data, and
means for encapsulating non-compliant broadcast data with appropriate headers so as to be compliant; and
executing the function by the broadcast data source interface.

21. A computer program product as in claim 20, wherein the function comprises registering the one or more broadcast data sources with the miniport.

22. A computer program product as in claim 20, wherein the function comprises deregistering the one or more broadcast data sources with the miniport.

23. A computer program product as in claim 20, wherein the function comprises indicating reception of the broadcast data and even notifications.

24. A computer program product as recited in claim 20, wherein the method further comprises:
calling, by the one or more applications, a function having one or more parameters of a presenter interface, wherein the presenter interface provides the one or more applications with access to a broadcast data presenter, the broadcast data presenter comprising means for retrieving the requested broadcast data from a common application interface; and
executing the function having the one or more parameters of the presenter interface.

25. A computer program product as in claim 24, wherein the function having one or more parameters of the presenter interface comprises the one or more applications selecting and enabling a particular class or type of broadcast data that is desired.

26. A computer program product as in claim 24, wherein the function having one or more parameters of the presenter interface comprises the one or more, applications indicating to the broadcast data presenter that the particular class or type of broadcast data is no longer desired.

27. A computer program product as in claim 24, wherein the function having one or more parameters of the presenter interface comprises the one or more applications returning the broadcast data to the broadcast data presenter.

28. A computer program product as recited in claim 20, wherein the method further comprises:
calling, by the one or more applications or the presenter, a function having one or more parameters of a RawData interface, wherein the RawData interface permits the one or more applications or the presenter to interface with a RawData module, wherein the RawData module comprises means for obtaining the requested data from the miniport in a raw format and for presenting the requested data to the one or more applications without the use of NDIS; and
executing the function having the one or more parameters of the RawData interface.

29. A method as defined in claim 28, wherein the function having one or more parameters of the RawData interface comprises the one or more applications specifying a particular class or type of broadcast data that is desired.

30. A method as defined in claim 29, wherein the function the RawData interface comprises the one or more applications specifying that the particular class or type of broadcast data is no longer desired.

31. A computer program product for implementing, in a system capable of receiving television broadcasts, a method for presenting broadcast data that is embedded in the one or more television broadcasts to an application, the computer program product comprising:
one or more computer readable media carrying computer executable instructions for implementing the method, wherein the computer executable instructions comprise program code means for:
receiving a request from an application for broadcast data, the request specifying a type of the requested data, a video port from which the requested data should be received, and any filtering that should be performed on the data;
capturing the broadcast data from one or more television broadcasts that are received at one or more video ports by one or more respective broadcast data sources, each of the broadcast data sources comprising a driver having means for decoding the broadcast data;

delivering the captured broadcast data to a miniport, the miniport comprising means for differentiating and separating the requested broadcast data from the captured broadcast data, the miniport further comprising means for differentiating between compliant broadcast data and non-compliant broadcast data and means for encapsulating non-compliant broadcast data with appropriate headers so as to be compliant;

transferring the broadcast data from the miniport to a common application interface;

retrieving the broadcast data from the common application interface by a presenter, the presenter comprising means for obtaining the broadcast data from both a common application interface comprising Winsock and a RawData interface; and preparing the broadcast data, by the presenter, for presentation to the application, as specified by the application.

32. A computer program product as defined in claim 31, wherein the miniport performs:

differentiating broadcast data that complies with a protocol from broadcast data that does not comply with the protocol; and encapsulating the broadcast data that does not comply with the protocol with headers such that the broadcast data complies with the protocol.

33. A computer program product as defined in claim 32, wherein the protocol is UDP/IP.

34. A computer program product as defined in claim 31, wherein transferring the broadcast data comprises:

transferring the broadcast data from the miniport to NDIS;

transferring the broadcast data from NDIS to a protocol; and transferring the broadcast data from the protocol to the common application interface.

35. A computer program product as defined in claim 31, wherein the common application interface is Winsock.

36. A computer program product as defined in claim 31, wherein the common application interface is a RawData interface.

37. A computer program product as defined in claim 31, wherein preparing the broadcast data comprises at least one of:

demultiplexing the broadcast data;

aggregating the broadcast data;

instance filtering the broadcast data;

duplicate filtering the broadcast data; and formatting the broadcast data for the application.

38. A computer program product as defined in claim 31, wherein capturing the broadcast data comprises enabling the broadcast data source.

* * * * *

UNITED STATES PATENT AND TRADEMARK OFFICE
CERTIFICATE OF CORRECTION

PATENT NO. : 6,892,390 B1
APPLICATION NO. : 09/526579
DATED : May 10, 2005
INVENTOR(S) : Lieberman et al.

It is certified that error appears in the above-identified patent and that said Letters Patent is hereby corrected as shown below:

In column 4, line 32, after "applications" delete "this" and insert -- is --, therefor.

In column 6, line 20, after "broadcast" delete ";".

In column 6, line 50, before "can" delete "user_data" and insert -- user data --, therefor.

In column 9, line 32, delete "winsock" and insert -- Winsock --, therefor.

In column 10, line 36, after "SelectRoutine" insert -- , --.

In column 11, line 5, delete "II 2" and insert -- 112 --, therefor.

In column 12, line 6, after "data" insert -- . --.

In column 12, line 27, delete "1160." and insert -- 160. --, therefor.

In column 12, line 64, delete "Rawdata" and insert -- RawData --, therefor.

In column 13, line 1, delete "With" and insert -- with --, therefor.

In column 13, line 29, in Claim 1, after "received" insert -- , --.

In column 13, line 49, in Claim 1, delete "form" and insert -- from --, therefor.

In column 14, line 25, in Claim 9, after "comprising" delete ";" and insert -- : --, therefor.

In column 14, line 31, in Claim 9, delete "miniports" and insert -- miniport --, therefor.

In column 15, line 1, in Claim 14, delete "th one" and insert -- the one or --, therefor.

In column 15, line 4, in Claim 15, after "one" delete ",".

UNITED STATES PATENT AND TRADEMARK OFFICE
CERTIFICATE OF CORRECTION

PATENT NO. : 6,892,390 B1
APPLICATION NO. : 09/526579
DATED : May 10, 2005
INVENTOR(S) : Lieberman et al.

It is certified that error appears in the above-identified patent and that said Letters Patent is hereby corrected as shown below:

In column 15, line 28, in Claim 19, after "comprises" insert -- the one or more applications specifying that the particular --.

In column 15, line 40, in Claim 20, after "interface" delete ",".

In column 16, line 20, in Claim 26, after "more" delete ",".

Signed and Sealed this

Seventh Day of April, 2009

JOHN DOLL
*Acting Director of the United States Patent and Trademark Office*